Jan. 5, 1954
C. C. BRUMBAUGH
2,665,240
METHOD OF OBTAINING ANHYDROUS HYDROGEN CHLORIDE
Filed June 16, 1951
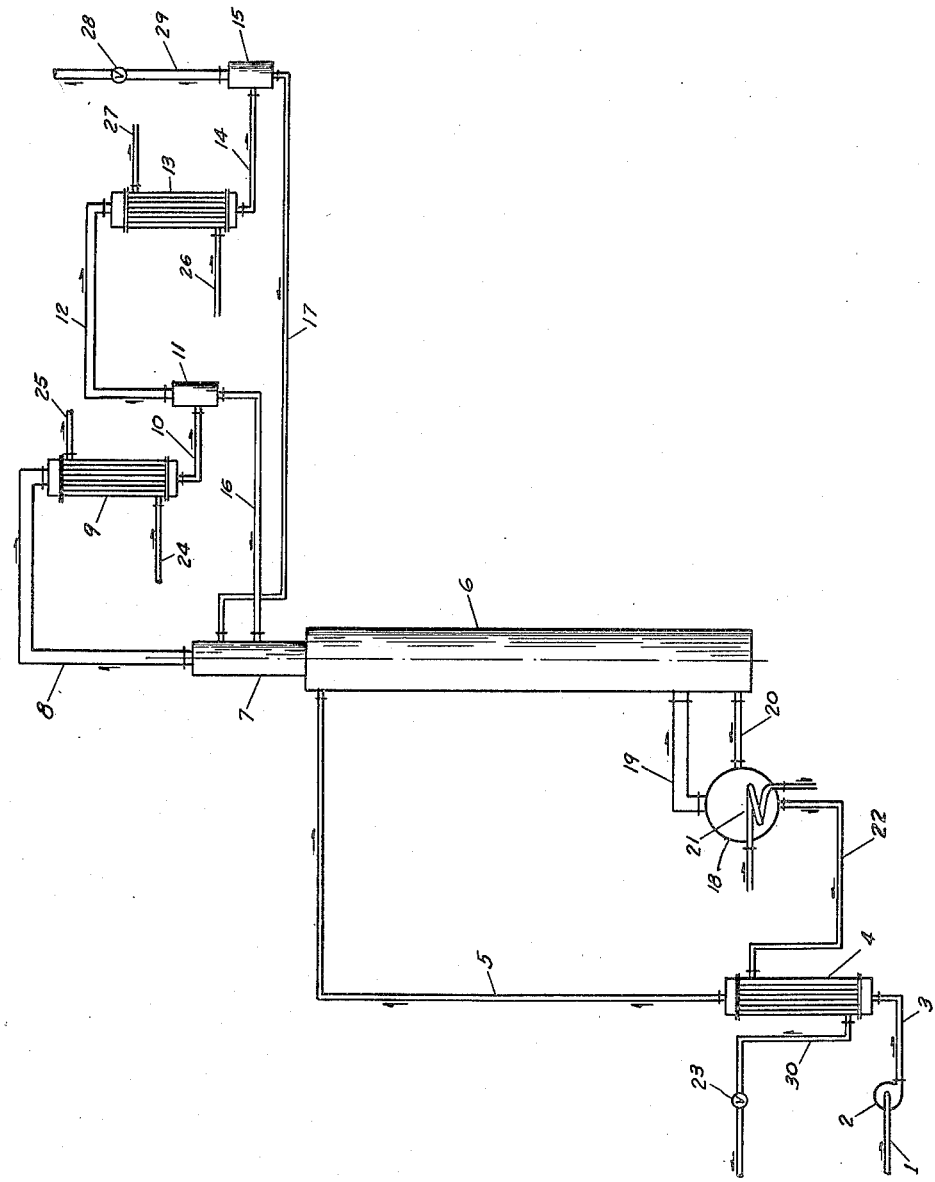
Inventor
CHESTER C. BRUMBAUGH
By Thornton F. Holder
Attorney Patented Jan. 5, 1954

2,665,240

UNITED STATES PATENT OFFICE 2,665,240

METHOD OF OBTAINING ANHYDROUS HYDROGEN CHLORIDE

Chester C. Brumbaugh, Painesville, Ohio, assignor to Diamond Alkali Company, Cleveland, Ohio, a corporation of Delaware Application June 16, 1951, Serial No. 232,071

3 Claims. (Cl. 202—51)

This invention relates to a process for the purification of hydrogen chloride, and more particulary relates to a process for obtaining hydrogen chloride in admixture with less than 0.05% of water, by weight, from impure aqueous hydrochloric acid solutions.

The invention has as its primary object the obtaining as a product, hydrogen chloride in admixture with less than 0.05% of water, by weight, and under pressure substantially in excess of atmospheric, and includes the utilization of this superatmospheric pressure in effecting the separation of hydrogen chloride from water.

This application is a continuation-in-part of my co-pending application Ser. No. 732,568, filed March 5, 1947, now abandoned.

Anhydrous hydrogen chloride, under superatmospheric pressure, is a reagent required in many types of organic and inorganic chemical processes. In some cases, the provision of the anhydrous material under pressure is necessary to effect the desired reaction, while in other cases, the provision of the anhydrous material under pressure is necessary to insure the passage of the gaseous material through the apparatus employed. In either case, the material must be employed at superatmospheric pressure. Examples of the first type of reaction where pressure is necessary include the addition of hydrogen chloride to unsaturated aliphatic organic compounds, such as olefines, examples of such reaction being the production of chlorobutane from butene, and ethyl chloride from ethylene. Similarly, the anhydrous material is necessary in the addition of HCl to acetylenic compounds, such as the reaction of HCl with acetylene itself to yield vinyl chloride.

An example of an inorganic process use of anhydrous hydrogen chloride is the well-known Deacon reaction comprising the reaction of hydrogen chloride with oxygen in the presence of a catalyst to yield chlorine and water. Thus, anhydrous hydrogen chloride under superatmospheric pressure, whether for the needs of a subsequent reaction or for the assurance of proper movement of reactants through a reactor, is a material having wide and varied use both in inorganic and organic synthesis.

It is well-known that if hydrochloric acid solutions containing more than about 20% of hydrogen chloride are subjected to simple distillation at amospheric pressure, the vapors of hydrogen chloride and water obtained, while far from anhydrous, will contain more hydrogen chloride and less water than the solution from which they are distilled so long as the concentration of hydrogen chloride in the distilland remains equal to or greater than about 20% by weight thereof. It is further known to dry the thus concentrated aqueous hydrogen chloride with dehydrating agents, such as 95% sulfuric acid, anhydrous calcium chloride, or successively with sulfuric acid and anhydrous aluminum chloride, whereby most of the water remaining in the vapor (about 1% by weight) is removed and substantially anhydrous hydrogen chloride is obtained. This multiple step method is, however, limited in its use because of the chemical nature of the desiccants employed and expense of operation involved. Moreover, the prior art sulfuric acid system, through previously in commercial use, is subject to the very substantial difficulty that a sulfuric acid vapor "mist" is released in the thus treated vaporous HCl. This mist, though present only in relatively minute amounts, is nevertheless of very substantial significance to users of the product of the method of this invention, e. g., particularly those chemical manufacturers who desire to use the product of the present invention for hydrochlorination of olefins or acetylenic hydrocarbons. This difficulty, though possibly based upon unexplained interference with the hydrochlorination reaction itself, appears more likely to be founded upon the very substantial corrosion problems which arise in apparatus in which sulfuric acid dried HCl is employed. Hence, the purely physical method of the present invention which produces HCl gas free of such impurities and containing water, another prime cause of corrosion, in amounts of as little as 0.05%, is much to be preferred over any prior suggested method where hydrochlorination is the ultimate use of the product thereof. Moreover, where anhydrous hydrogen chloride under pressure is desired, it is then necessary to undergo the expense of compressing such substantially anhydrous material by means of a pump or the like to achieve this condition.

Also, it has been proposed to obtain anhydrous hydrogen chloride by compressing a mixture of vapors of HCl and water, containing not more than 33% of water, by weight, sufficiently to effect the liquefaction of the vapors, at temperatures of the order of 100° F., i. e., at about 1200 p. s. i. This procedure, however, according to the disclosure describing it, and apart from the hazards of handling strong aqueous hydrochloric acid solutions and vapors at pressures of the order of 70 atmospheres, gives a final product containing about 0.5% of water, by weight, which water apparently may only be removed ultimately by chemical means.

It has likewise been taught that certain hydrohalic acids may be separated from each other by distillation at low temperatures and at atmospheric or subatmospheric pressures or alternately at high temperatures with superatmospheric pressures. Such teachings, however, are not directed to the problem here solved and do not contemplate the utilization of pressure under which the terminal material is desired in the course of rendering the acid anhydrous.

It is apparent that the term "anhydrous hydrogen chloride" has been used in the prior art to designate HCl in admixture with upwards of 0.5% of water, by weight, and that these proposed methods for producing such "anhydrous" material are inadequate for the obtaining of hydrogen chloride containing less than 0.05% of water, by weight, by physical means alone from aqueous solutions of HCl in water. Also the obtaining of HCl in admixture with less than 0.05% of water, by weight, from aqueous solutions of HCl by prior art methods appears not to have been taught except by a combination of physical and chemical steps, the effluent HCl-water vapors then being fed to a pressure pump in order to obtain the product of the method of the present invention. Such procedure, however, though possibly attractive from a general theoretical standpoint, is extremely difficult to apply practically. The difficulty arises both from the necessity of obtaining highly purified hydrogen chloride, especially with respect to water, and from the highly corrosive character of strong hydrochloric acid which is produced by the contact of anhydrous hydrogen chloride with relatively small amounts of water, such as water vapor normally in the atmosphere. Hence, compressing vapors of hydrogen chloride in admixture with small amounts of water presents pumping problems not present in the compression of ordinary gaseous fluids. Thus, obviously the operation of a blower or similar pumping mechanism, with suction of less than atmospheric pressure, involves maintenance difficulties. For example, slight leaks in the pump connections, or leaks at compressor packing glands, result in introduction of water vapor from the atmosphere into the system, whereby the substantially anhydrous character of the hydrogen chloride is destroyed and highly corrosive hydrochloric acid forms. In accordance with the present invention, there is no necessity of passing the hydrogen chloride vapors to a pressure pump in order to obtain the ultimate compressed product desired.

The present invention contemplates a method which utilizes the apparent disadvantage of delivering hydrogen chloride vapors to a pressure pump, by initially subjecting an aqueous solution of hydrogen chloride to the desired pressure, and utilizing such pressure for subsequent steps of separating hydrogen chloride from water by physical means alone, whereby a far more effective method and less expensive apparatus are employed than would be required to remove the same amount of water by prior art methods. No problems similar to those met in connection with the compression of hydrogen chloride vapors, as described in the prior art, accompany the placing of a hydrochloric acid solution under pressure.

More specifically, the present invention contemplates a method which utilizes the apparent disadvantage of having to deliver hydrogen chloride vapors at pressure above atmospheric pressure, by initially subjecting an aqueous solution of HCl containing more than 20% of HCl, by weight, to a pressure within the range of 15–250 p. s. i. gauge, maintaining said pressure throughout the steps of heating said solution to the boiling point thereof at the pressure prevailing in the system to vaporize a mixture of HCl and water from said solution, cooling the vaporized mixture to a temperature above 0° F. and below the dewpoint of said mixture at the prevailing pressure to form a strong aqueous HCl solution and a vapor phase containing HCl and less than 0.05% of water, by weight, in admixture therewith, separating said solution and said vapor phase, and recovering said vapor phase containing HCl under a pressure within said range.

It is an object of the present invention to provide a process for the production of anhydrous hydrogen chloride containing less than 0.05% of water, by weight, at moderate pressures above atmospheric.

Another object of the invention is to provide a method which utilizes the superatmospheric pressure under which the final product is desired to assist in the removal of impurities, such as water.

A further object is to provide a continuous process for providing anhydrous hydrogen chloride in continuous production at moderate pressures above atmospheric.

Other objects and advantages will appear from the following description of the invention and from the drawing illustrating one method of obtaining anhydrous hydrogen chloride under superatmospheric pressure according to this invention.

The present invention utilizes certain data not heretofore disclosed in the art, which data show that at pressures within the above-noted range, the partial pressure of water in the vapors obtained from a boiling mixture of HCl and water containing 20% or more of HCl, by weight, is sufficiently low at temperatures of the order of 0° F. to 15° F. to effect the drying of HCl-water vapor mixtures by physical means alone. Thus, it has been found that at pressures within the range of 15–250 p. s. i. (gauge), and with cooling of the HCl-water vapor mixture to a temperature above 0° F. and below the dewpoint of the mixture, HCl gas is obtained which has a water content at least equal to and customarily less than vapors from the same source dried with 95% sulfuric acid at 95° F. Such HCl gas is, of course, obtained without any sulfuric acid "mist" therein. This degree of dehydration compares with that obtainable by prior art physical methods for drying HCl-water vapor mixtures by a reciprocal factor of 50 to 100 times. Where prior art physical methods have effected the drying of HCl-water vapor mixtures only to the extent that such mixtures contain 0.5%–1% of water, by weight, the present invention affords a method whereby by physical means alone, the water content of HCl-water vapor mixtures is readily reduced to less than 0.05% by weight, or to a factor of the order of less than $\frac{1}{10}$ to $\frac{1}{20}$ the value obtainable by prior art physical methods.

The temperature-pressure relationships given above are critical in the practice of the method of the present invention for the reason that at temperatures and pressures within these ranges and below the dewpoint of the vapors involved, the partial pressure of water in the vapors in contact with the liquid phase HCl-water mixtures obtained is sufficiently low to give the desired degree of dehydration of the vapor phase, while at the same time the formation of a solid phase of the mono- or di-hydrate of HCl in the apparatus does not take place. These factors are obviously of prime importance in a process, the objects of which include producing HCl gas containing less than 0.05% of water, by weight, and providing for the continuous production of such gas at moderate pressures above atmospheric pressure.

It is, of course, understood by those skilled in the art that values given for the water content of HCl-water vapor mixtures are dependent somewhat upon the analytical method employed, and that while the values of any given analytical method are comparative within themselves, values obtained by different analytical methods are, in general, not reliable as a basis for comparison of dehydration processes. Hence, the values given herein are not intended to be absolute but are believed to be sufficiently comparative within themselves to evaluate the dehydration processes under discussion. The method employed in determining the values given herein is essentially that of Karl Fischer, which method takes advantage of the fact that sulfur dioxide is oxidized by iodine only in the presence of moisture. Absolute methanol is used as the medium in which the titration of a sample is carried out with Karl Fischer's reagent (a solution of iodine and sulfur dioxide in dry pyridine).

In the drawing, which comprises a diagrammatic elevation of an apparatus embodying the principles of the invention, a conduit 1 leads to a pump 2 adapted to maintain the desired pressure on the system. Pump 2 is connected to heat exchanger 4 through line 3. Line 5 connects heat exchanger 4 to stripping column 6, which is provided with means for establishing vapor-liquid transfer surfaces; such means as inert packing or the like, not shown, have been found suitable. The top of the stripping column has scrubber section 7, which connects by line 8 to heat exchanger having a first section 9 through which a heat exchange fluid is passed by means of entry and exit pipes 24 and 25. Effluent line 10 from section 9 leads to liquid-vapor separator or trap 11. Vapor line 12 from separator 11 leads to a further section 13 of the heat exchanger, section 13 being provided with additional entry and exit lines 26 and 27 for passage of heat exchange fluid. From heat exchanger section 13, effluent line 14 leads to liquid-vapor separator 15. Vapor line 29, which may be throttled or closed by valve 28 to maintain pressure, leads out of the system and to any convenient point of collection or utilization of the product, anhydrous HCl in admixture with less than 0.05% of water, by weight. Sections 9 and 13 of the heat exchanger may also be arranged in vertical relationship so as to provide only one piece of equipment and eliminate one of the liquid-vapor separators in the series. In such arrangement, it is of course preferable to maintain the minimum temperature of the heat exchanger in the same range as that set forth above.

The scrubber section 7 is connected to separators 11 and 15 by lines 16 and 17 respectively, line 17 preferably entering the scrubber section at a point somewhat above the entry point of line 16.

Returning to stripping column 6, line 20 at the bottom thereof leads to reboiler 18, which is heated suitably by means of steam line 21 or the like. Line 22 connects reboiler 18 to heat exchanger 4, hereinabove described; line 30 in fluid connection with heat exchanger 4 and opposite line 22 on heat exchanger 4 serves as the weak acid effluent line from the system through pressure maintaining valve 23. Reboiler 18 is also connected to the lower portion of stripping column 6 through line 19, which enters the stripper at a point above the entry point of line 20.

Obviously, the materials of construction of the entire system are acid impervious materials such as "Karbate," tile, glass, acid-resistant metals preferably with treated or coated surfaces, or other similar materials.

The operation of the apparatus is apparent from the description of its elements. In one embodiment of the invention, the apparatus is utilized substantially as follows: An aqueous hydrochloric acid solution of any convenient strength in excess of 20% by weight, for example, 36%, is introduced into the system and placed under superatmospheric pressure by pump 2, imposing a pressure of 20 p. s. i. gauge upon solution. The solution under this pressure is heated in exchanger 4 to a temperature of the order of 170° F. and passes to the top of stripper 6, where a mixture of hydrogen chloride and water vapor is evolved and passes to scrubber section 7. The vapors escaping from the scrubber pass through heat exchanger section 9, which is water-cooled and which lowers the temperature of the vapors to a point of the order of 95° F., causing partial condensation of the vapors at the working pressure of the system, i. e., about 20 p. s. i. gauge. Separation of vapor and liquid phases takes place in liquid-vapor separator 11. Vapors of hydrogen chloride in admixture with water pass to the second section 13 of the heat exchanger. Section 13 is cooled by refrigerants, such as brine or the like, to a temperature not below about 0° F., and preferably not substantially above 15° F. Within this temperature range in the final section of the heat exchanger, a second partial condensation takes place at the working pressure of the system. Liquid and vapor pass to the second liquid-vapor separator 15; the vapor phase escaping through line 29 contains hydrogen chloride in admixture with water in an amount not in excess of 0.05% by weight and normally of the order of 0.02%–0.04%.

The concentrated liquid hydrogen chloride solutions collected in liquid-vapor separators 11 and 15 under super-atmospheric pressure are returned, as shown, to the scrubber where they provide substantial cooling of vapors therein; the heat content of vapors rising in stripping column 6 causes evolution of some of the HCl and water from the liquid phase entering the scrubber, the residual HCl in the liquid phase serving ultimately to augment the hydrochloric acid entering stripper 6 through line 5. Thus, the effluent from separator 11 under the above-described conditions has a temperature of the order of 95° F. and that from separator 15, of the order of 0° F. It will be appreciated that substantial cooling of the vapors from the scrubber, which have a temperature within the range of 250°–300° F. is brought about by this recycling, whereby the hydrogen chloride rich vapors entering the first water-cooled section of the heat exchanger are cooled to 150°–200° F. By this recycling, the load on the heat exchanger is lessened. This combination of cooling with the working pressure maintained on the entire system provides an efficient and inexpensively operated system for obtaining the ultimate purified hydrogen chloride, by physical means alone, especially where delivery of hydrogen chloride in admixture with less than 0.05% of water, by weight, and under pressure is desired.

The bottoms from the stripper 6, which include hydrogen chloride poor liquor, stripped of much of its HCl content by ascending vapors, in descending through the stripper column, passes to reboiler 18 where it is heated to a temperature of the order of 275°–300° F. Vapors formed as a result of this heating are returned to the stripper and by giving up a portion of their heat content to the solution with which they are in contact, cause the release of HCl from the solution and thereby become enriched as they pass upwardly therethrough. The dilute aqueous hydrogen chloride solution leaving the reboiler 18 through line 22 has a concentration of the order of the constant boiling mixture of HCl and water, i. e., about 20%, and passes through heat exchanger 4 to heat the incoming liquor by indirect heat exchange, and thence out of the system where it may be utilized as muriatic acid or reconcentrated by any convenient means to a 30%–40% hydrogen chloride solution, and thus recycled to the system.

It will be apparent that the apparatus described is but one means of practicing the method of the invention. For example, in the event that anhydrous hydrogen chloride under much higher pressure than the 20–50 p. s. i. gauge is desired, the vapor pressure of water is such at the higher pressure that one of the heat exchanger sections may be dispensed with while still maintaining substantial purity of product. Similarly, under some circumstances a third condenser may be desired. In addition, while the combination of pressures and temperatures described has been found to produce the desired anhydrous product, obviously other pressures and temperatures within the above ranges may be employed while not departing from the spirit of the invention. In a like manner, the various provisions for recycling, heat exchange and the like may be modified or omitted entirely without departing from the spirit of the invention.

While I have described in detail certain forms of my invention and a specific embodiment of its practice, I do not wish to be understood as limiting myself to the use of such specific embodiment as I realize that changes within the scope of the invention are possible.

What is claimed is:

1. A method of producing anhydrous HCl which includes the steps of subjecting an aqueous solution of HCl containing at least 20% of HCl, by weight, to a pressure within the range of 15–250 p. s. i. gauge, heating said solution to the boiling point thereof at the pressure prevailing in the system to vaporize a mixture of HCl and water from said solution, cooling the vaporized mixture to a temperature substantially within the range of 0°–15° F., at the prevailing pressure to form a strong aqueous HCl solution and a vapor phase containing HCl, separating said solution and said vapor phase, maintaining said pressure upon the system throughout said steps, and recovering said vapor phase, as said anhydrous HCl, under said pressure.

2. The method as claimed in claim 1 wherein said strong aqueous HCl solution is passed in countercurrent contact with the vaporized mixture of HCl and water from the boiling aqueous solution of HCl, during the step of cooling said mixture under said pressure to a temperature within said range.

3. The method of claim 1 in which said aqueous solution contains between 30–40% of HCl, by weight, said pressure maintained throughout said steps is within the range of 20–25 p. s. i. gauge, and said vaporized mixture of HCl and water is maintained in contact with said strong aqueous HCl solution during the cooling of said mixture to a temperature within said range.

CHESTER C. BRUMBAUGH.

References Cited in the file of this patent

UNITED STATES PATENTS

| Number | Name | Date |
| --- | --- | --- |
| 1,892,652 | Heath | Dec. 27, 1932 |
| 1,897,996 | Barstow | Feb. 21, 1933 |
| 1,906,467 | Heath | May 2, 1933 |
| 2,012,621 | Bennett | Aug. 27, 1935 |
| 2,408,933 | Iverson | Oct. 8, 1946 |
| 2,432,405 | Gerhold | Dec. 9, 1947 |
| 2,463,188 | Latchum | Mar. 1, 1949 |
| 2,450,415 | Benning | Nov. 19, 1951 |

OTHER REFERENCES

Van Nuys: Transactions, American Institute of Chemical Engineers, vol. 39, pages 663–678.